(12) United States Patent
Cornell

(10) Patent No.: US 6,213,508 B1
(45) Date of Patent: Apr. 10, 2001

(54) VEHICLE SEAT BELT DEVICE

(75) Inventor: Leon H. Cornell, Woodstock, CT (US)

(73) Assignee: Seatbelt Partners Corporation, Providence, RI (US)

( * ) Notice: Subject to any disclaimer, the term of this patent is extended or adjusted under 35 U.S.C. 154(b) by 0 days.

(21) Appl. No.: 09/412,569

(22) Filed: Oct. 8, 1999

(51) Int. Cl.$^7$ ................................................ B60R 22/00
(52) U.S. Cl. ................. 280/801.1; 280/808; 296/68.1; 297/468; 297/482
(58) Field of Search ................ 280/801.1, 808; 296/68.1; 297/468, 482, 483

(56) References Cited

U.S. PATENT DOCUMENTS

| | | |
|---|---|---|
| 482,271 | 9/1892 | Openshaw et al. . |
| 558,019 | 4/1896 | Harshaw . |
| 2,663,031 | 12/1953 | Kalthoff . |
| 2,960,180 | 11/1960 | Wachtel . |
| 3,233,941 | 2/1966 | Selzer . |
| 3,495,849 * | 2/1970 | Cetrone . |
| 3,799,577 * | 3/1974 | Colucci ................................. 297/388 |
| 3,940,166 | 2/1976 | Smithea . |
| 4,177,807 * | 12/1979 | Ocel et al. ......................... 297/482 X |
| 4,234,229 | 11/1980 | Arnold . |
| 4,528,705 * | 7/1985 | Greeenwalt ................................. 5/441 |
| 4,541,654 * | 9/1985 | Jonasson ........................... 280/808 X |
| 4,619,468 * | 10/1986 | Spill ....................................... 297/483 |
| 4,758,048 | 7/1988 | Shuman . |
| 4,759,588 * | 7/1988 | Husnik ............................. 297/468 X |
| 4,819,278 * | 4/1989 | Ramos .............................. 297/468 X |
| 4,834,460 * | 5/1989 | Herwig .............................. 297/468 X |
| 4,840,404 | 6/1989 | Falterman . |
| 4,951,965 * | 8/1990 | Brown .................................. 297/468 |
| 5,016,915 * | 5/1991 | Perry .............................. 280/808 X |
| 5,074,588 * | 12/1991 | Huspen ............................ 280/808 X |
| 5,439,253 * | 8/1995 | Trubiano ............................ 280/801.1 |
| 5,482,324 * | 1/1996 | Gardiner et al. .................... 280/801.1 |
| 5,570,933 * | 11/1996 | Rouhana et al. ....................... 297/483 |
| 5,624,135 * | 4/1997 | Symonds ............................ 280/801.1 |
| 5,647,611 * | 7/1997 | Boyd et al. ........................ 280/801.1 |
| 5,788,282 * | 8/1998 | Lewis ..................................... 280/808 |
| 5,836,656 * | 11/1998 | Baggott ............................ 297/468 X |
| 5,909,927 * | 6/1999 | Henshall ............................... 297/468 |
| 5,934,749 * | 8/1999 | Pond et al. ....................... 297/483 X |

FOREIGN PATENT DOCUMENTS

| | | |
|---|---|---|
| 2838141 | 3/1980 | (DE) . |
| 2208468A | 4/1989 | (GB) . |
| 260924 * | 5/1964 | (NL) . |

* cited by examiner

Primary Examiner—Lanna Mai
Assistant Examiner—Toan C To
(74) Attorney, Agent, or Firm—Fisher, Christen & Sabol

(57) ABSTRACT

A device for use in conjunction with a standard three-point seat belt harness assembly to provide for restraint of potential rearward motion of a vehicle occupant. The device includes a secondary belt which is fixedly attached to one portion of the harness assembly on one side of the seat and affixedly to the floor attachment post on the opposite side of the harness assembly at the other side of the seat. An adjustable unit is provided on the second belt to tighten across the back of the occupant and for when the seat or the back of the seat is moved or adjusted.

9 Claims, 3 Drawing Sheets

VEHICLE SEAT BELT DEVICE

BACKGROUND OF THE INVENTION

1. Field of the Invention

The invention relates to a safety device for use in conjunction with a conventional three-point harness or shoulder belt now utilized in most vehicles, such as automobiles and the like.

2. Background Art

There is widespread use of, and requirement of use of, conventional three-point harnesses or shoulder belts in most vehicles such as automobiles and the like. Such harnesses or shoulder belts are conventionally attached to vertically-spaced first and second mounting points on the vehicle's framework, such as a reinforced post and the like. The opposed terminal belt ends are attached to these mounting points and a fastener is provided upon the intermediate run of belt such that the belt may be drawn across one's shoulder and chest and affixed on the other side of the seat to a third vehicle mounting point. In addition, some mechanism to allow the belt to be gradually played out and frictionally withdrawn to provide a comfortable yet snug belt fit upon the user in a seated position upon the vehicle seat while additionally providing for fixed restraint during an emergency, such as a vehicle accident. The general intention of such belts is to prevent the vehicle's occupants from being thrown forward during a frontal vehicle crash. Such belts have met with remarkable success for such purpose.

There are, however, a number of accident types which, instead of subjecting the driver or passengers to a forward motion, subject them to motion that includes at least rearward force such that the vehicle's occupants, particularly those sitting in the front seats, are thrown rearward and injured as a result thereof. Strongly reinforced vehicle front seat backs in most cases could prevent the rearward motion of the front seat occupants, but such added restructure is costly and involved and may interfere with the operation of the seat backs which afford access to the rear seats to provide desirable tilting movement thereto. Accordingly, it is desirable to provide some means by which passengers and vehicle drivers are prevented from being physically thrown rearward during such accidents.

While there are some devices that provide back support or restraint to vehicle occupants or operators, especially bicycles and motorcycles and the like, none of these devices is especially adapted to or particularly useful with the standard three-point shoulder belt or harness provided in modern vehicles. Examples of such prior art devices are those disclosed in U.S. Pat. No. 482,271, U.S. Pat. No. 558,019, U.S. Pat. No. 2,663,031, U.S. Pat. No. 2,960,180, and U.S. Pat. No. 3,940,166. See also U.S. Pat. No. 4,758, 048, U.S. Pat. No. 4,619,468, U.S. Pat. No. 3,233,941, U.S. Pat. No. 4,840,404, U.S. Pat. No. 4,951,965, and U.S. Pat. No. 4,234,229.

BROAD DESCRIPTION OF THE INVENTION

A primary object of the invention is to provide a device for use in association with a conventional three-point safety harness which restrains rearward movement of the vehicle occupants in a straightforward, efficient yet low cost manner. Another object of the invention is the provision of such a device which additionally provides for occupant back support in the form of supplementary pillow or pad which can be additionally inflated and deflated. A further objective of the present invention is a device which can be used either in combination with a three-point shoulder harness to provide for added back support of the vehicle occupant seats especially the front seats thereof. Other objects and advantages of the invention are set out herein or are obvious here from to one skilled in the art. The objects and advantages of the invention are achieved by the device of the invention.

The device of the invention dealing with the three-point safety harness is meant primarily for use with adults and with children weighing at least 70 to 80 pounds.

The invention involves a device which is used in combination with a vehicle seat restraint of the type known as a three-point shoulder belt. The three-point shoulder belt has a first unitary belt including opposed first and second terminal ends which are in turn respectively fixedly attached to a first vehicle mounting point above the user's shoulder and a second vehicle mounting point below the user's lap when the user is normally seated upon the vehicle seat. Both of the first and second mounting points are located on one side of the seat. The first belt includes a first fastener segment mounted thereon and through which the first belt is adapted to run freely. The first fastener segment is attached to the vehicle at a third vehicle mounting point located proximate to the seat and on the opposite side thereof from which the first and second vehicle mounting points are located such that the belt is restrained at three points when the first fastener segment is releasably attached to the third vehicle mount point in the normal use position of the three-point shoulder belt. The third vehicle mount point is usually a post comprised of a flat, rigid material. The device comprises a second belt having first and second terminal ends and first and second intermediate runs. The first terminal end of the second belt is fixedly attached to the first belt at a position proximate to the seat on the same side thereof as the first and second vehicle mounting points. The second belt passes across the seat and in back of the user. The second terminal end of the second belt is fixedly attached to the third vehicle mounting point below the first fastener segment. The first and second intermediate runs of the second belt are adjustedly affixed together. The second belt is in a use position so as to restrain the user from rearward motion as during a vehicle accident.

BRIEF DESCRIPTION OF THE INVENTION

In the drawings, which illustrate the best mode presently contemplated for carrying out the present invention:

DETAILED DESCRIPTION OF THE INVENTION

Figure 1:
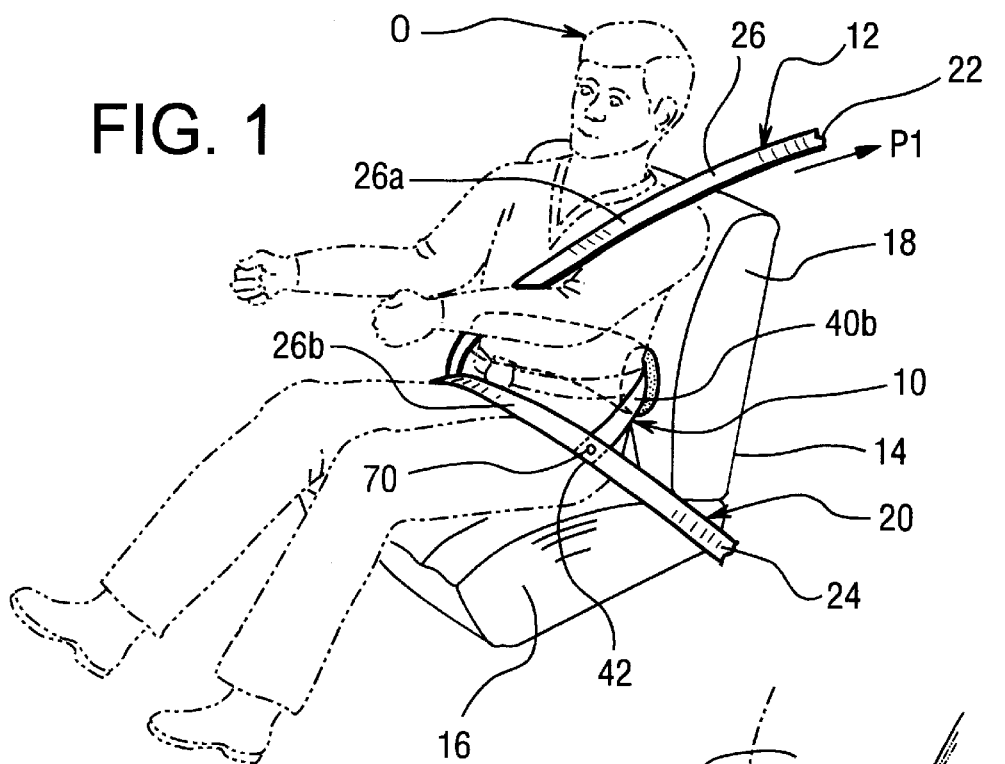
FIG. 1 is a front perspective view showing a vehicle driver restrained by a three-point shoulder harness assembly which is modified by the device of the invention.

Referring to the drawings and particularly FIGS. 1 through 6 thereof, the device 10 of the invention is adapted for use with a three-point shoulder harness assembly 12 conventionally provided in modern vehicles, such as automobiles. Such assembly 12 is designed to restrain the driver or occupants O from forward motion during a vehicle accident while the occupant is seated in the normal position upon a seat 14. Such seat includes a lower portion 16 on which the occupant sits and an elevated or essentially vertical back portion 18 which may or may not be tiltable either in a forward or rearward direction dependent upon the particular automobile's features.

The harness assembly 12 includes a first belt 20 having opposed terminal first and second ends 22 and 24, respectively, and an intermediate run 26. The first terminal end 22 of the first belt 20 is conventionally attached to a first vehicle mounting point P1 generally above the occupant's shoulder and at a generally reinforced portion of the vehicle body or frame such as a post or the like (not shown). This first vehicle mounting point P1 very often takes the form of a frictional roller which enables the belt to be alternately played out and frictionally retracted for positioning and comfort of the occupant yet provides for fixed retention during an emergency situation. Such roller constructions are conventional and, accordingly, have not been shown. Other provisions for the conventional operation of the three-point shoulder assembly 12 may also be utilized.

Figure 4:
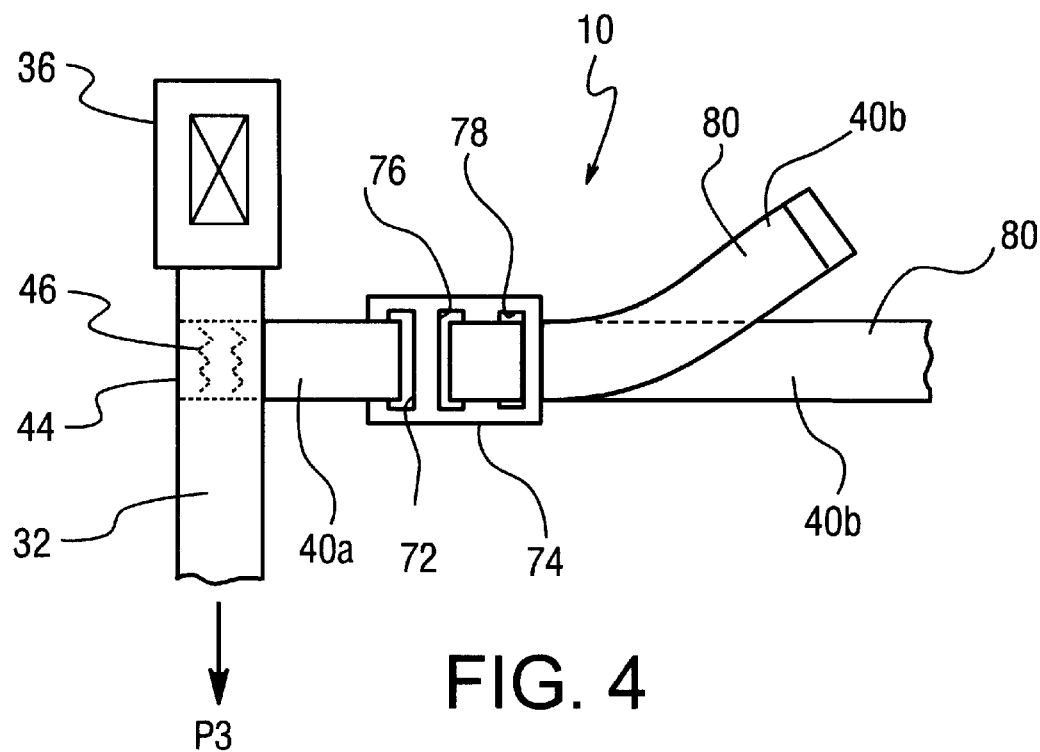
FIG. 4 is a front view of the portion of the second or back belt near the right side of the driver.
Figure 7:
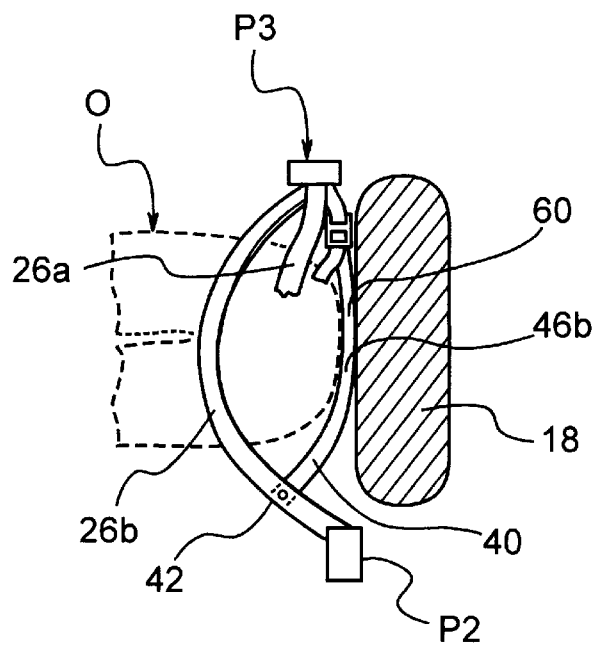
FIG. 7 is a partial sectional plan view taken along the line 5—5 of FIG. 1.

The second terminal end 24 of the first belt 20 is generally fixedly positioned at a second vehicle mounting point P2 at a position lower than the occupant's lap and also to a reinforced body or frame vehicle portion schematically shown FIG. 7. In harness assemblies 12 of this type, the intermediate belt run 26 is generally provided with a fastener segment 30 as shown in FIG. 4 which, when coupled with a mating fastener segment 36 provided at a third vehicle mounting point P3, enables the belt to be drawn across the occupant's body and releasably positioned in that attitude vis-a-vis the cooperative releasable engagement of the fastener segment 30. The fastener segment 30 in turn serves to divide the looped or intermediate belt run 26 into upper and lower runs 26a and 26b, respectively. In the particular case shown, the fastener segment 30 cooperates with a third vehicle mounting point P3 including a post (rigid leaf member) 32. In the present case, the third vehicle mounting point is shown including the post portion 32, but this may indeed be a fixed point or include a strap member or the like (not shown).

Figure 2:
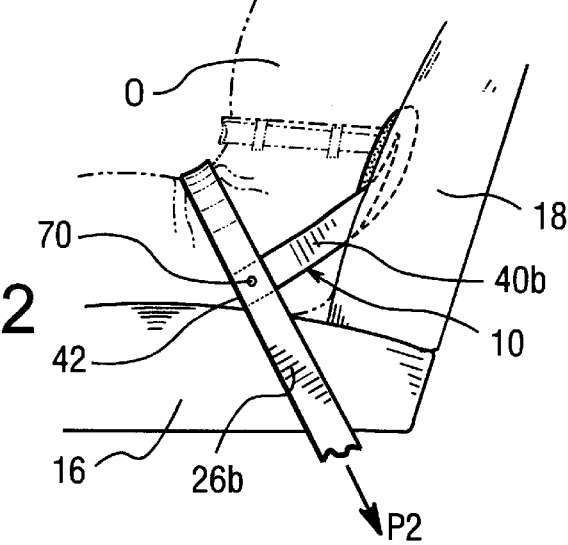
FIG. 2 is a partial side elevational view taken from the right side of FIG. 1, that is, from left of the driver.
Figure 3:
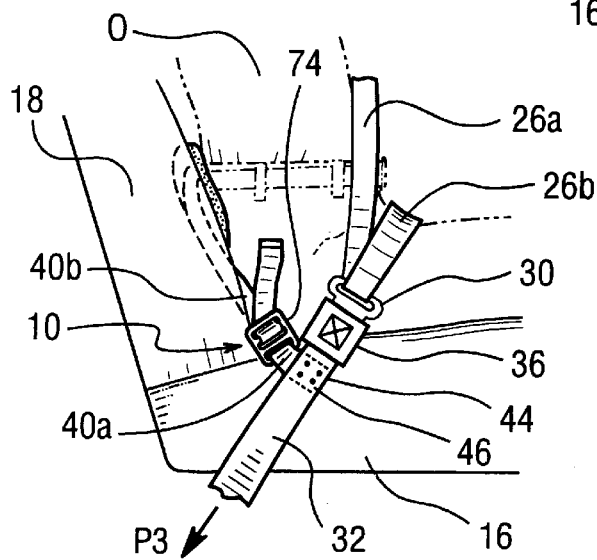
FIG. 3 is a partial side elevational view taken from the opposite side.

Since the above is primarily a description of a conventional three-point harness assembly, attention is again directed to the drawings, particularly FIGS. 1 through 3, to illustrate the manner in which the device 10 of the present invention is operatively associated with such three-point harness assembly 12 so as to provide for novel features of the present invention. Therein the device 10 includes a second belt 40 having first and second terminal ends 42 and 44, respectively, and intermediate runs 40b and 40a, respectively. The first end 42 is preferably fixedly attached to the second belt portion 26b at a point generally in line with occupant's thigh or buttocks. Such attachment is preferably achieved by rivet 70 or may be provided by sewing or the like. As the belt portions 26a and 26b move upward and downward and between use and storage positions, the first end 42 of the second belt 40 moves therewith to some extent. But because of the fixed length of belting between P2 and where the first end 42 is fastened to the belt portion 26b, the first end 42 generally remains at a position proximal to the level of seat 16 or next to the occupant's thigh.

Figure 5:
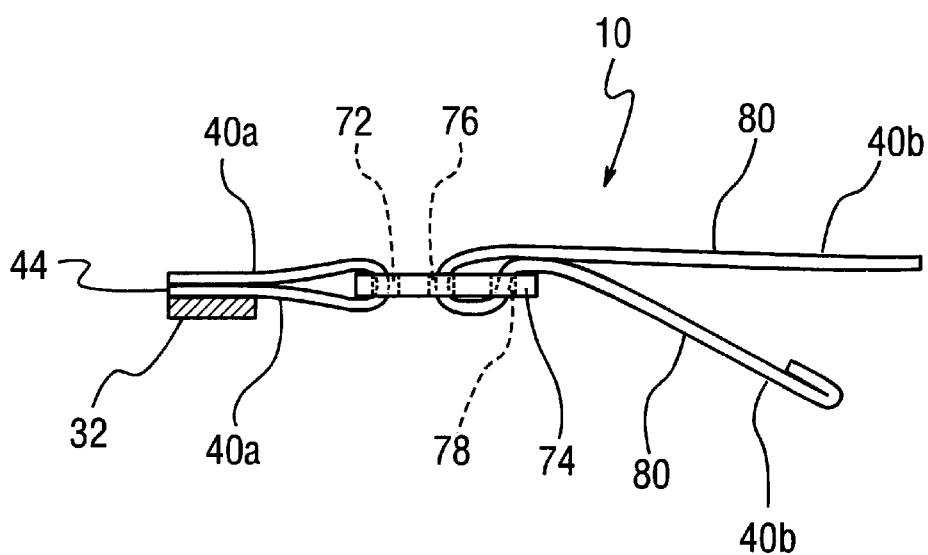
FIG. 5 is a top view of the adjustment portion of the second belt.
Figure 6:
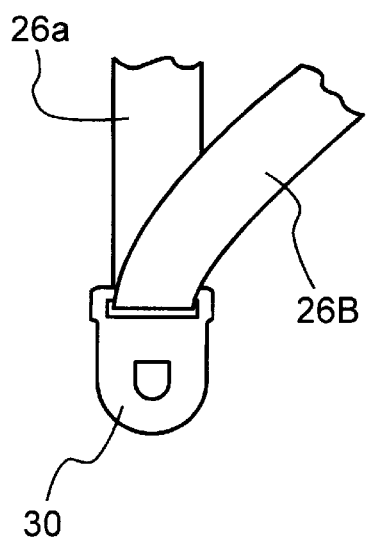
FIG. 6 is an enlarged view of the slide fastener through which the looped portion of the harness belt extends.

The second terminal end 44 of the belt 40 is preferably fixedly attached to post 32 by sewing 46 or may be provided by riveting or the like. Referring to FIG. 5, intermediate run 40a, which is relatively short, fits through slot 72 in buckle unit 74 and doubles back on itself so that one end thereof overlies the other end thereof. The overlying ends of intermediate 40a are sewn or otherwise fixedly attached to post 32 below mating fastener segment 36. Intermediate run 40b, which is relatively long, extends along the side of buckle unit 74, fits through slot 76 of buckle unit 74, extends towards and fits through slot 78 of buckle unit 74 so as to extend back towards end 42. In this manner, the end of portion 80 of intermediate run 40b doubles back on itself. End portion 80 of intermediate run 40b and buckle unit 74 provide means for adjusting the length of belt 40 to fit the crosswise size of the back of the driver or the occupant of the automobile. The device 10 can be used with children of at least 70 or pounds and adults. The device 10 is positioned with belt 40 in back of the occupant, preferably at the small of his or her back.

In this manner, it will be apparent that when the occupant O is subjected to rearward forces, the device 10 restrains such motion without the need for additional mounting points and in a straightforward, low-cost manner. The device 10 in restraining such rearward motion of the occupant additionally reduces the strain placed upon the seat back 18 such that it is less likely the seat back will fail and, accordingly, secondarily injure occupants in the automobile's back seat or second or third seats, if so provided.

Figure 8:
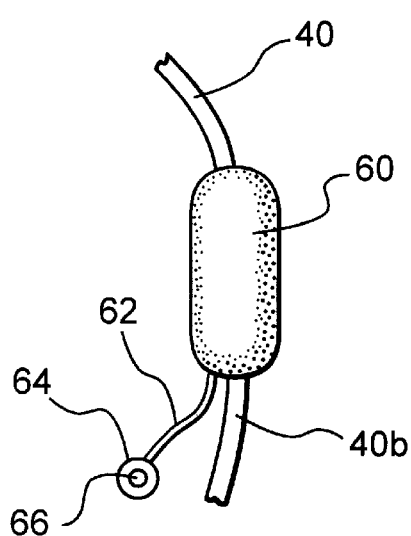
FIG. 8 is a somewhat schematic view showing a modified form of the device of the invention.

Referring now particularly to FIG. 8 of the drawings, the belt 40 may be provided with a back support member 60 either through which the intermediate run 40b of the belt 40 passes or, alternatively, where the back pad 60 is connected to intermediate run 40b of the belt 40. It is preferable to provide for the belt 40 to pass entirely through the pad 60 or for the pad to be attached to the inner portion of the belt 40, so that the belt 40 is positioned proximate the inner surface of the seat back 18 and the pad 60 is positioned immediately against the occupant's back, rather than vice versa. This eliminates the need to concentrate or focus on the pad 60's material composition or manufacturing method, and thus one can rely entirely on the strength of the belt 40 for the rearward motion restraint. In some cases it is desirable to make the pad 60 of an inflatable and deflatable type. For that purpose a tube 62, which is provided with a squeeze bulb 64 and a pressure release button 66, is included.

Figure 9:
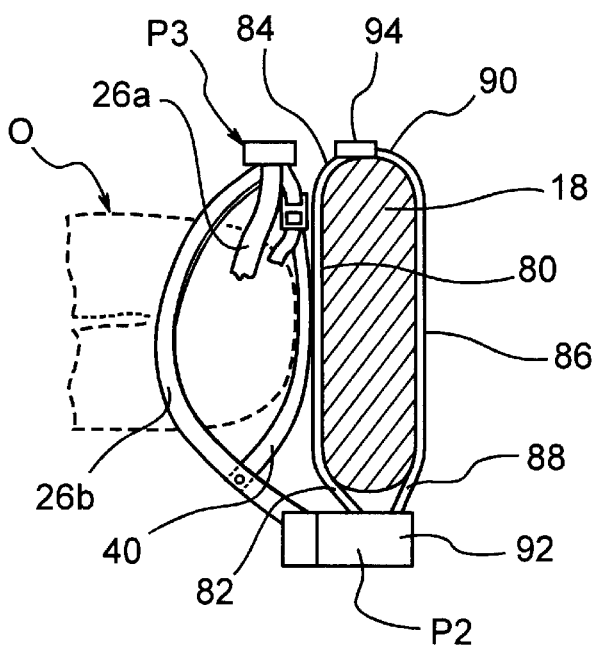
FIG. 9 is a partial sectional view similar to FIG. 5 but showing a further modified form of the invention.

Referring now particularly to FIG. 9 of the drawings, it will be seen that a third belt 70 may be positioned essentially in back of the seat back 18 to restrain it directly from rearward movement, as during a vehicle accident and the like. In this case, the third belt 70 includes opposed first and second terminal ends 72 and 74, respectively, which are mounted to fourth and fifth vehicle mounting points 76 and 78, respectively. The third belt 70 may be utilized in conjunction with the device 10 or separately therefrom. It should be pointed out that the first terminal end of the belt 70 is preferably attached to a strengthened vehicle portion, such as the reinforced post P2 shown, and at a height preferably about midway up the vertical extent of the seat back to reduce movement or leverage forces that may be imparted thereto by any rearward motion of the occupant o unrestrained by the device 10. Similarly, the fifth vehicle mounting point 78 should also be somewhat elevated, although some downwardly slanted belt 70 attitude from the fourth vehicle mounting point 76 to the fifth vehicle mounting point 78 may be permitted.

A fourth belt 80 may also be provided either separately or in conjunction with belt 70. The belt 80 is provided with first and second terminal ends 82 and 84, respectively, and are mounted to fourth and fifth vehicle mounting points 76 and 78, respectively. The fourth belt 80 goes in front of the seat portion (back) 18 and thus restrains the seat from forward motion similar to the action provided by belt 70 in the case of rearward force. The belts 70 and 80 may be formed from a single belt having intermediate portions extending in back of and in front of the vehicle seat 18, or two separate belts interconnected at their respective first and second terminal ends, or even entirely separate belts.

While there is shown and described herein a certain specific structure embodying this invention, it will be manifest to those skilled in the art that various modifications and rearrangements of the parts may be made without departing from the spirit and scope of the underlying inventive concept. It will also be manifest that the inventive concept is not limited to the particular forms shown and described herein, except insofar as indicated by the scope of the appended claims.

What is claimed is:

1. A device for restraint of a user directly sitting in a vehicle seat for use in combination with a vehicle seat restraint of the type known as a three-point shoulder belt and having a first unitary belt, including opposed first and second terminal ends which are in turn respectively fixedly attached to a first vehicle mounting point above the user's shoulder and a second vehicle mounting point below the user's lap when the user is normally seated upon the vehicle seat, and wherein both said first and second mounting points are located on one side of the seat, and wherein said first belt includes a fastener segment mounted thereon and through which said first belt is adapted to run freely, said fastener segment attached to said vehicle at a third vehicle mounting point located proximate to said seat and on the opposite end thereof from which said first and second vehicle mounting points are located such that the belt is restrained at three points when the fastener segment is releasably attached to said third vehicle mounting point in the normal use position of the three-point shoulder belt, said device comprising a second belt having first and second terminal ends and first and second intermediate runs, said first terminal end of said second belt being fixedly attached to said first belt at a position proximal to said seat and on the same side thereof as said first and second vehicle mounting points, said second belt passing across the seat and in back of the user, said second terminal end of said second belt being fixedly attached to said third vehicle mounting point below said first fastener segment, said first and second intermediate runs of said second belt being adjustedly affixed together, said second belt being in a use position so as to restrain the user from rearward motion as during a vehicle accident.

2. The device of claim 1 wherein said first terminal end of said second belt is fixedly attached to said first belt by means of a rivet.

3. The device of claim 1 wherein said second intermediate run of said second belt is shorter than said first intermediate run of said second belt.

4. The device of claim 1 wherein said first and second intermediate runs of said second belt are adjustedly affixed together by means of a slide buckle unit.

5. The device of claim 1, wherein said device includes a padded user backrest positioned on said second belt.

6. The device of claim 5, wherein said backrest is inflatable and deflatable.

7. A device for use in combination with a vehicle seat restraint of the type known as a three-point shoulder belt and having a first unitary belt, including opposed first and second terminal ends which are in turn respectively fixedly attached to a first vehicle mounting point above the user's shoulder and a second vehicle mounting point below the user's lap when the user is normally seated upon the vehicle seat, and wherein both said first and second mounting points are located on one side of the seat, and wherein said first belt includes a fastener segment mounted thereon and through which said first belt is adapted to run freely, said fastener segment attached to said vehicle at a third vehicle mounting point located proximate to said seat and on the opposite end thereof from which said first and second vehicle mounting points are located such that the belt is restrained at three points when the fastener segment is releasably attached to said third vehicle mounting point in the normal use position of the three-point shoulder belt, said device comprising a second belt having first and second terminal ends and first and second intermediate runs, said first terminal end of said second belt being fixedly attached to said first belt at a position proximal to said seat and on the same side thereof as said first and second vehicle mounting points, said second belt passing across the seat and in back of the user, said second terminal end of said second belt being fixedly attached to said third vehicle mounting point below said first fastener segment, said first and second intermediate runs of said second belt being adjustedly affixed together, said second belt being in a use position so as to restrain the user from rearward motion as during a vehicle accident, a third belt having opposed first and second terminal ends and an intermediate run wherein the first and second ends of third belt are fastened to fourth and fifth vehicle mounting points and said intermediate run of said fourth belt passes in back of the user's seat to prevent the seat from moving forward as during a vehicle accident.

8. The device of claim 7, which includes a fourth belt having opposed first and second terminal ends and an intermediate run wherein the first and second ends of said third belt are fastened to fourth and fifth vehicle mounting points and said intermediate run of said fourth belt passes in front of the user's seat to prevent the seat from moving forward as during a vehicle accident.

9. The device of claim 7, wherein said third and fourth belts are interconnected at their respective first and second terminal ends.

* * * * *